(No Model.)

J. P. GREELEY.
SOAP CAKE.

No. 389,296. Patented Sept. 11, 1888.

Witnesses:
J. F. Theo. Lang.
E. J. Fenwick.

Inventor:
John P. Greeley,
by his atty,
Munn, Fenwick & Lawrence.

UNITED STATES PATENT OFFICE.

JOHN P. GREELEY, OF LONDONDERRY, NEW HAMPSHIRE.

SOAP CAKE.

SPECIFICATION forming part of Letters Patent No. 389,296, dated September 11, 1888.

Application filed January 26, 1888. Serial No. 262,001. (No model.)

*To all whom it may concern:*

Be it known that I, JOHN P. GREELEY, a citizen of the United States, residing at Londonderry, in the county of Rockingham and State of New Hampshire, have invented certain new and useful Improvements in Cake Soap; and I do hereby declare the following to be a full, clear, and exact description of the invention, such as will enable others skilled in the art to which it appertains to make and use the same.

My invention relates to an improvement in that description of soap commonly known as "cake soap," or that class of hard soap which in its manufacture is formed in molds; and it consists in combining a quantity of soap with a sponge sufficient to form a given size of cake in such manner that the soap used shall fill all the holes throughout the piece of sponge, thereby producing, when it has become "set" in a mold, a cake, which may be designated as "sponge-soap," the advantages of which and its mode of production I will now proceed to describe.

Figure 1:
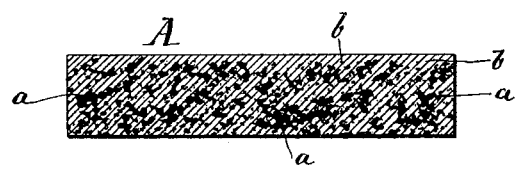
Figure 2:
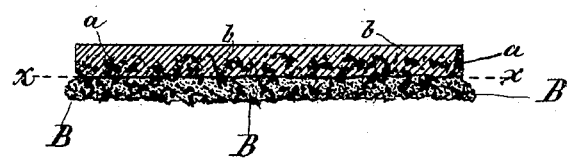

In the drawings, Figure 1 is a cross section of a cake of soap made in accordance with my invention, and Fig. 2 is a like view showing the cake in the condition it will appear after having been about half used up.

In manufacturing a cake, A, of this soap—as, for example, of a size as indicated in cross-section in Fig. 1—I first take a piece of sponge which has been dampened sufficiently to expand the same and thoroughly open its pores, and then cut it somewhat into the form of the cake to be produced. I then place the sponge into the mold which is to give permanent form to the cake, and, having closed the mold, pour into it the hot liquid soap, allowing the same to remain until the contents of the mold have become thoroughly cold and formed into the condition of a solid cake. In Fig. 1 the cake so formed is supposed to be represented, in which the dark spots, as $a$, indicate the sponge portion of the cake, and the light portion, as $b$, the soap, the soap having, while hot and on being poured into the mold, run into the openings or pores of the sponge and permeated throughout its entire body. In this condition, when the contents of the mold are removed, a solid cake of soap will have been produced, which is particularly effective for removing the grime from the hands of persons whose occupations are apt to soil them, as well as for scrubbing floors and wood-work of a dwelling, the soap, water, and sponge each doing its appropriate work simultaneously while such act is being performed.

In Fig. 2 the soap portion $b$ of the cake A shown in Fig. 1 is represented as having been worn away about one-half below the line $x$ $x$, or more or less, as the case may be, thus leaving on the under side of the cake A a mat of sponge, as at B, which constitutes an effective scrubbing-surface in the act of using the cake for cleansing purposes, the soap being supplied from above the mat B and mingling with the water held in suspension by the mat. In this manner the water used in "washing" or "scrubbing" is held by the sponge, and being by capillary attraction brought into contact with the soap, the latter, becoming liquefied, mingles with the water, and on the sponge becoming squeezed in the act of washing the proper consistence of combined soap and water is expelled therefrom.

I claim—

A cake of soap, A, having sponge $a$ combined therewith, substantially as and for the purpose described.

In testimony whereof I hereunto affix my signature in presence of two witnesses.

JOHN P. GREELEY.

Witnesses:
R. T. SMITH,
B. B. WHITTEMORE.